United States Patent [19]

Swedenklef

[11] Patent Number: 6,022,074
[45] Date of Patent: Feb. 8, 2000

[54] SEAT FOR USE IN A VEHICLE

[75] Inventor: Bo Swedenklef, Järved, Sweden

[73] Assignee: Autoliv Development AB, Vargarda, Sweden

[21] Appl. No.: 09/043,174

[22] PCT Filed: Sep. 13, 1996

[86] PCT No.: PCT/SE96/01142

§ 371 Date: May 15, 1998

§ 102(e) Date: May 15, 1998

[87] PCT Pub. No.: WO97/10117

PCT Pub. Date: Mar. 20, 1997

[30] Foreign Application Priority Data

Sep. 14, 1995 [SE] Sweden .................................. 9503202
Sep. 25, 1995 [SE] Sweden .................................. 9503316
Oct. 16, 1995 [SE] Sweden .................................. 9503636

[51] Int. Cl.[7] ................................................. B60N 2/42
[52] U.S. Cl. ................................. 297/216.14; 297/216.13
[58] Field of Search ........................... 297/216.1, 216.13, 297/216.14

[56] References Cited

U.S. PATENT DOCUMENTS

| | | |
|---|---|---|
| 3,802,737 | 4/1974 | Mertens . |
| 5,129,707 | 7/1992 | Yamauchi . |
| 5,219,202 | 6/1993 | Rink et al. .......................... 297/216.13 |
| 5,437,494 | 8/1995 | Beauvais . |
| 5,676,421 | 10/1997 | Brodsky .......................... 297/216.14 X |
| 5,746,467 | 5/1998 | Jesadanont ..................... 297/216.13 X |

FOREIGN PATENT DOCUMENTS 0556884 8/1993 European Pat. Off. .

Primary Examiner—Peter R. Brown
Attorney, Agent, or Firm—Veneable; George H. Spencer; Norman N. Kunitz

[57] ABSTRACT

A seat for use in a vehicle has a squab and a seat-back element, the seat-back element is mounted so that when the vehicle is subjected to a rear impact, initially the lower part of the seat-back element moves rearwardly relative to the squab and relative to the upper part or head-rest provided on the seat, so that the head of the occupant of the vehicle is brought into contact with the head-rest. Subsequently, the entire seat-back may move rearwardly, for example by pivoting about an axis defined by the recliner mechanism.

17 Claims, 10 Drawing Sheets

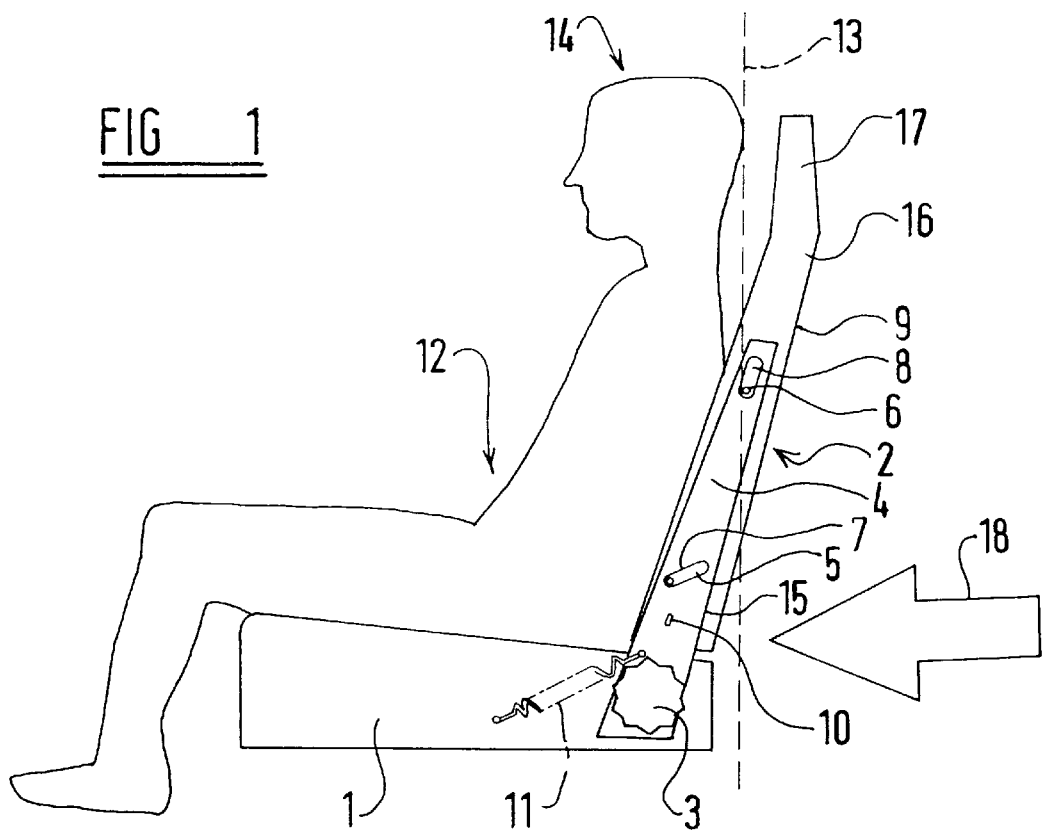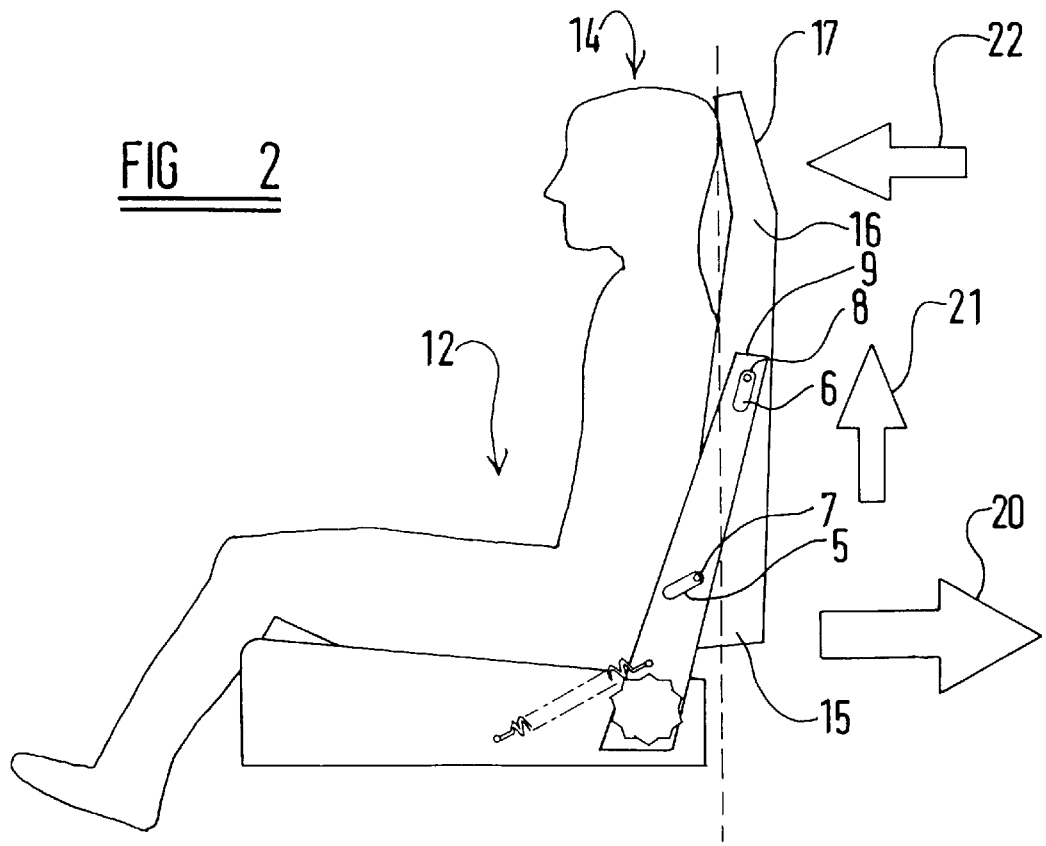

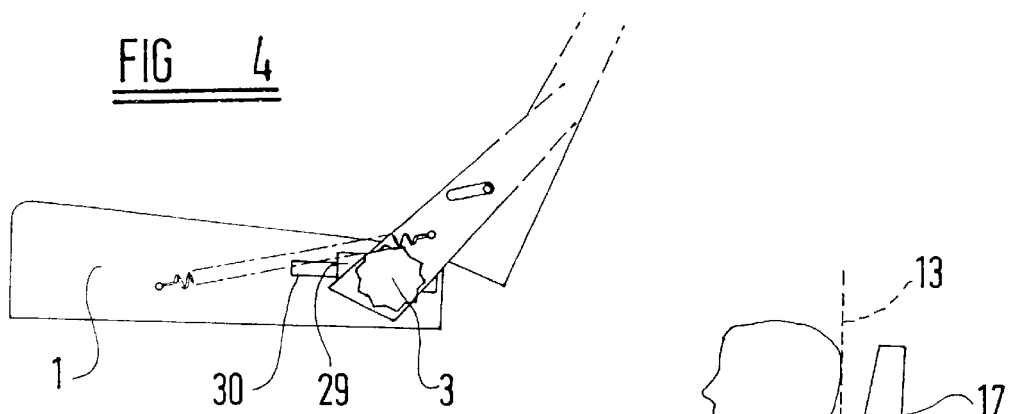
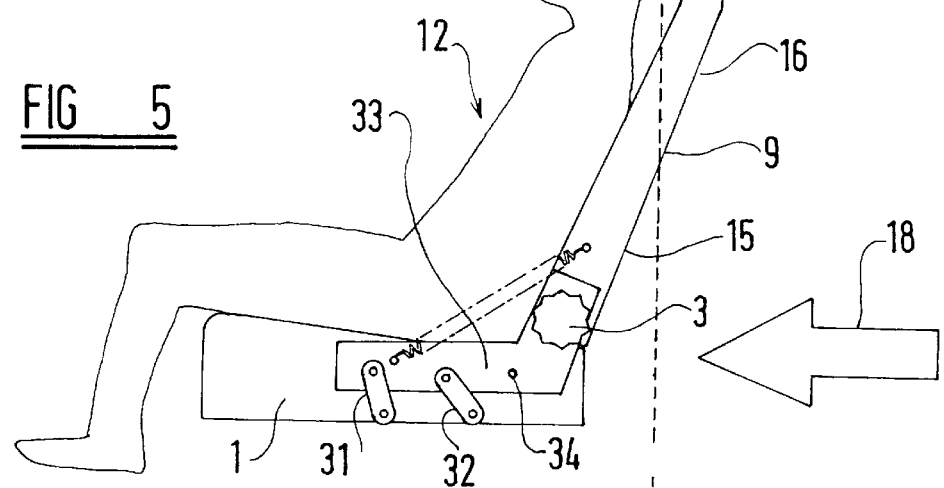
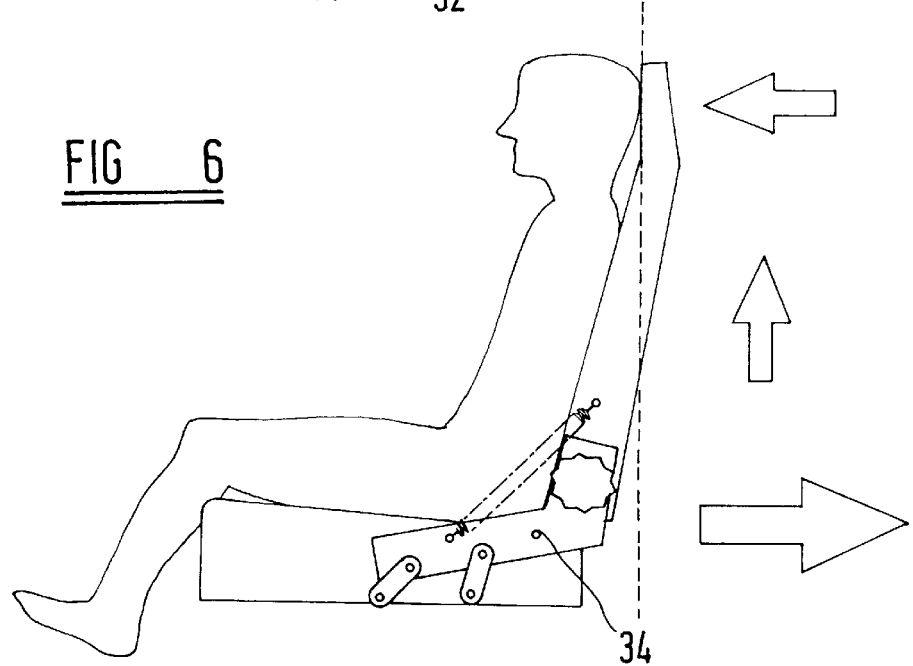

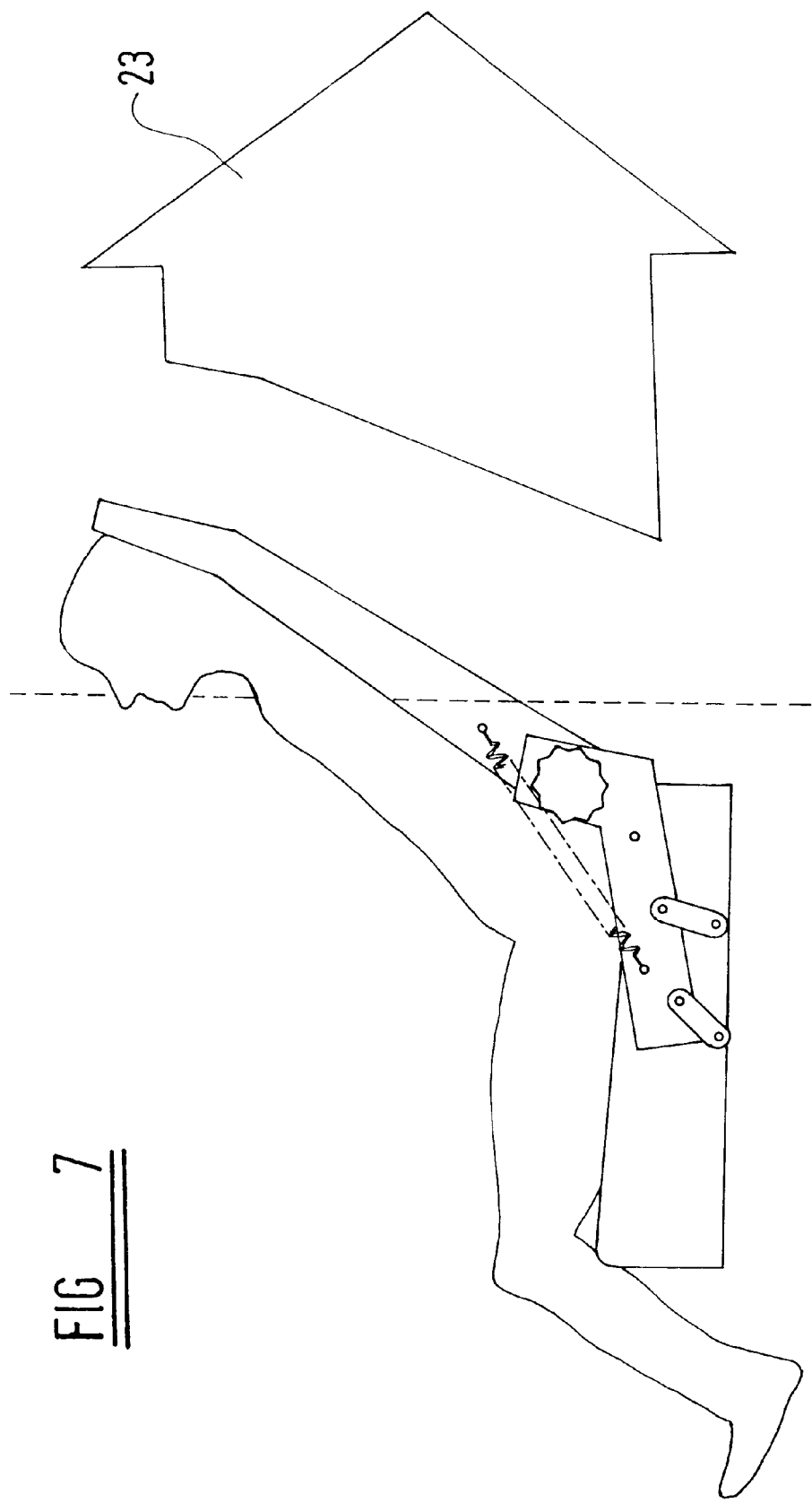

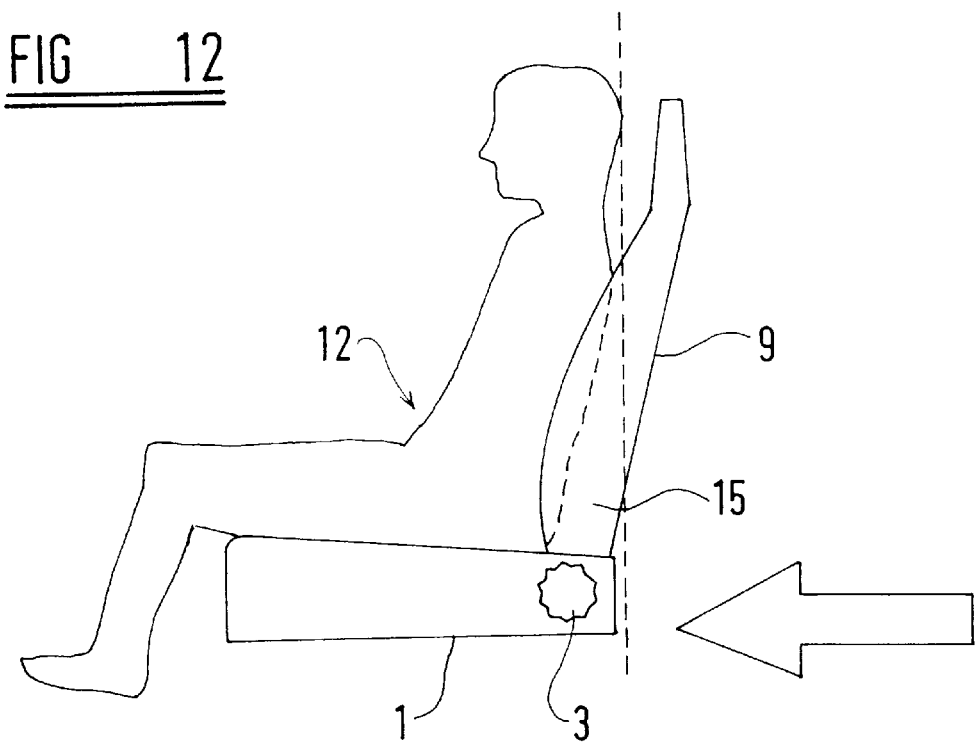
FIG 12
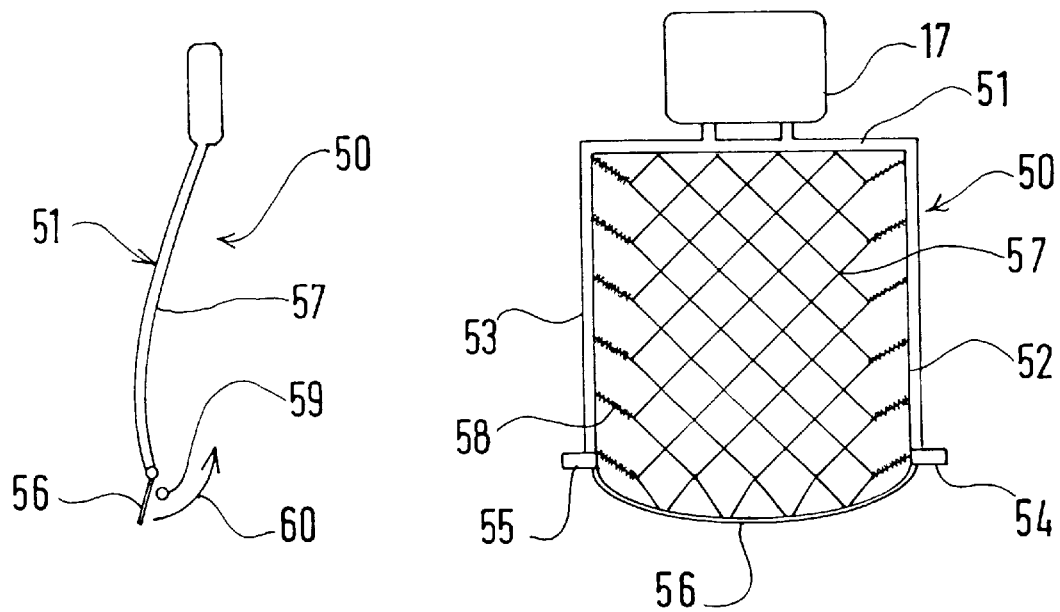
FIG 13
FIG 14

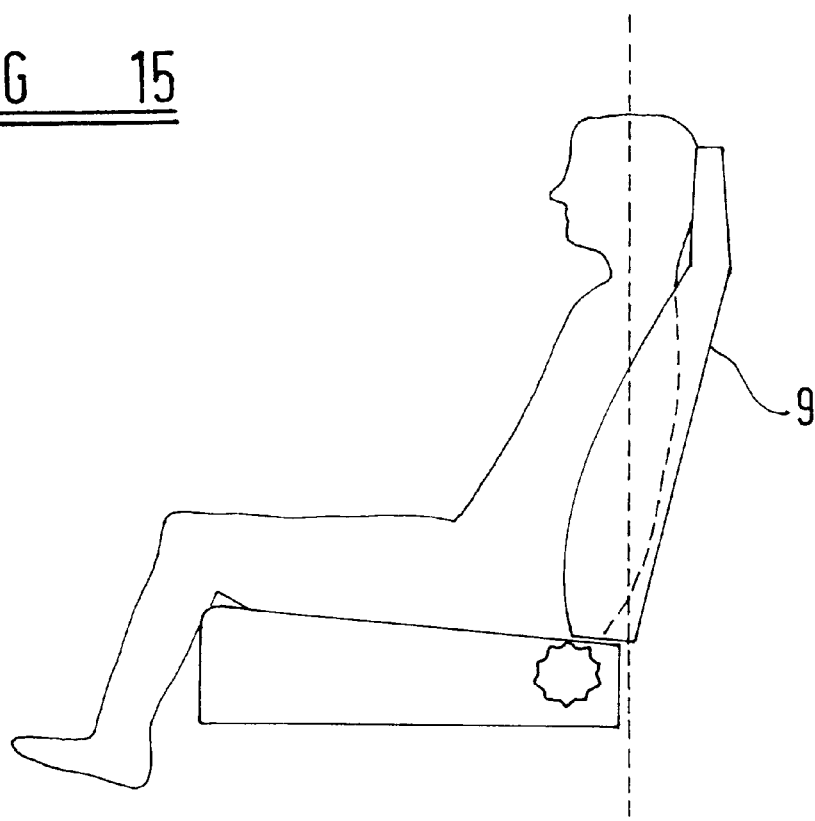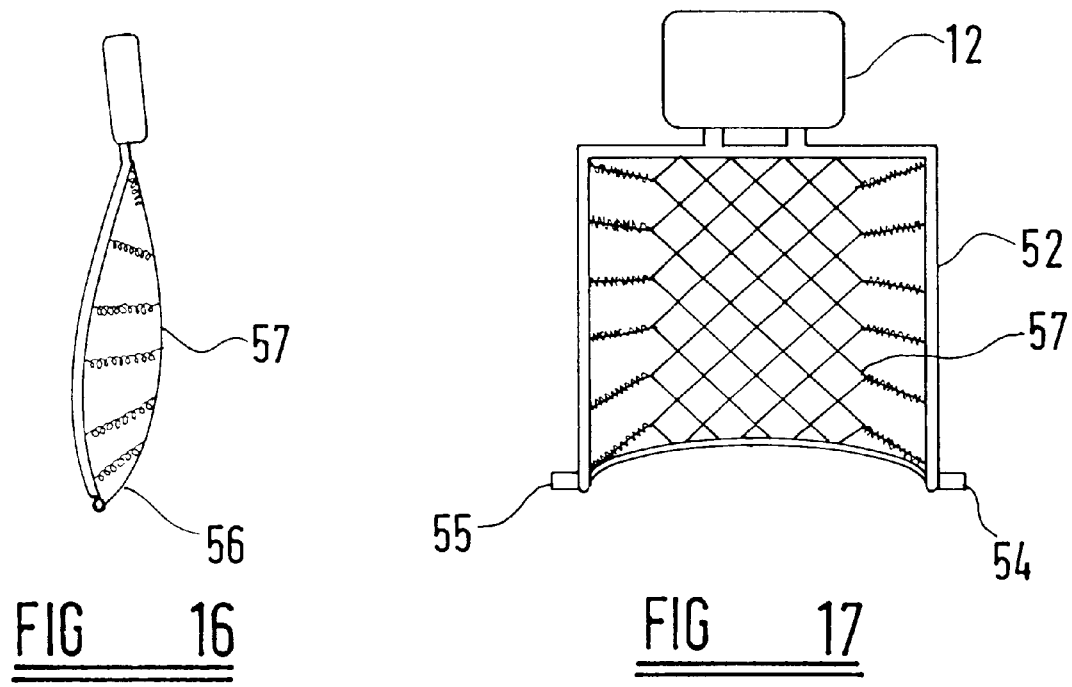

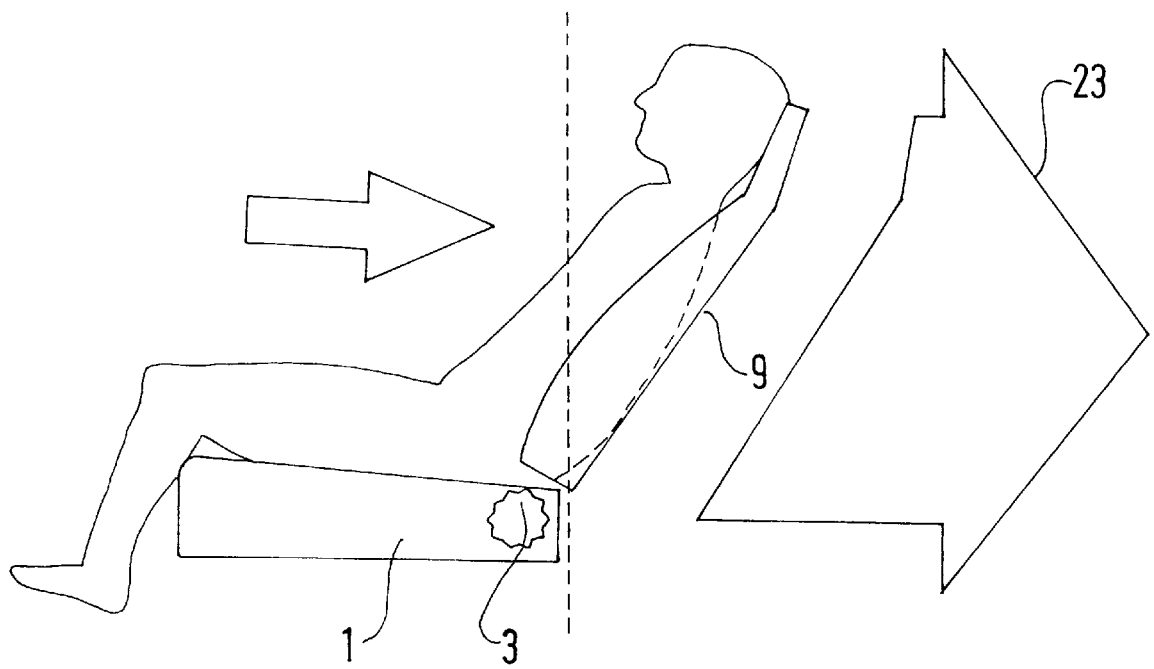

SEAT FOR USE IN A VEHICLE

BACKGROUND OF THE INVENTION

THE PRESENT INVENTION relates to a seat for use in a vehicle and more particularly relates to a seat intended for use in a passenger transport vehicle such as a car, lorry or bus.

The present invention seeks to provide a seat suitable for damping the effects of a high pressure impact against the seat back-rest by the occupant of the seat, as may occur, for example, in the event of a rear impact. Such high pressure impacts often cause injuries termed "whiplash" injuries.

A conventional vehicle seat consists of a seat squab and a back-rest. The squab and the back-rest may be cushioned and upholstered. Typically, the lower part of the back-rest is attached to the rear part of the seat squab. It is common for a recliner mechanism to be provided which forms the connection between the lower part of the back-rest and the seat squab which enables the angle of inclination of the back-rest to be altered. The recliner mechanism thus comprises an adjustment mechanism. It is also conventional for a seat to be mounted to be moved forwardly and rearwardly, for example to permit the position of the seat to be adjusted to suit the length of the legs of the occupant. In some vehicles, part of the vehicle seat back-rest can be moved in relation to the lower back of the occupant to provide adjustable lumbar support.

If a first vehicle, which is stationary or moving only at a low speed, is hit from behind by another vehicle which is travelling at a greater speed, initially the chassis of the first vehicle is accelerated forwardly. Because the chassis is accelerated forwardly, each seat in the vehicle, which is connected to the chassis, is also accelerated forwardly. Because of the inertia of an occupant of the seat, the lower torso of the occupant will be pushed against the lower part of the back-rest of the seat as the seat accelerates. Since the upper part of the torso is typically not in contact with the back of the seat, the upper part of the torso cannot readily follow this movement.

Consequently, the lower part of the torso of the occupant executes an apparent forward motion, while the head of the occupant stays virtually stationary for a brief moment. This movement eventually results in a severe rearward bending of the neck, and may cause ligaments, and other soft tissue in the upper neck, to tear.

Subsequently, in a rapid movement, the head is typically thrown forwardly in a rebound and may be pressed forcefully against the chest of the occupant. This may tend to amplify injury caused during the first movement.

The movement described above can occur with prior proposed seat designs, since when an occupant is sitting on a vehicle seat, there is, typically, a gap between the neck or head of the occupant and any head-rest or head restraint mounted on the seat.

It has been proposed to provide seats in motor vehicles which are designed to minimise the risk of injury to the occupant of the seat in the event that a rear impact should occur.

EP-A-0,556,884 discloses a seat assembly which has a seat squab and a back-rest, the back-rest being adapted to move rearwardly relative to the seat squab when subjected to a severe loading by the occupant of the seat during a rear collision. The back-rest of the seat has side supports which are pivotally connected to slide members, the slide members being adapted to move with a horizontal linear movement in horizontally extending channel members secured to the squab of the seat. An energy-absorber is provided to absorb energy as the side members move rearwardly relative to the seat.

In the event that a rear impact occurs, the occupant of the seat moves rearwardly and imposes a rearward force against the back-rest of the seat. The seat-back moves rearwardly with the slide members sliding relative to the channels. During this movement, energy is absorbed by the energy absorber.

The seat-back can also, at the same time, pivot rearwardly until further rearward movement of the seat-back is prevented by a wire which has one end secured to the seat-back and the other end secured to a floor panel of the vehicle.

Since the back of the seat can pivot rearwardly, there is no mechanism that brings the head-rest that may be mounted on the seat swiftly to a position adjacent, or into contact with, the head of the occupant of the seat. Consequently, this particular seat design does not remove the risk of whiplash injury occurring.

U.S. Pat. No. 3,802,737 also discloses a safety seat intended to protect the occupant of a vehicle during a rear impact. Instead of being rigidly mounted in position, the squab of the seat is connected to the floor of the vehicle by means of a pair of link arms, and the head-rest of the vehicle seat is connected to the back of the seat by means of an adjustable linkage.

In the event that a rear impact occurs, the squab of the seat, together with the back of the seat, are both tilted forwardly about the link arms connecting the seat to the floor of the vehicle, and as a consequence of pressure being applied to part of the linkage supporting the head-rest by rearward movement of the torso of the occupant of the seat, the head-rest is brought into contact with the rear of the head of the occupant of the seat. The described arrangement does have exposed linkages which may tend to jam.

The present invention seeks to provide an improved seat for use in a motor vehicle.

SUMMARY OF THE INVENTION

According to this invention there is provided a seat for use in a vehicle, the seat being provided with a squab which is secured to the floor of the vehicle and a back-rest element which is mounted on the squab for movement relative to the squab, the seat being adapted to effect predetermined movements when the seat is occupied and the vehicle in which the seat is mounted is subjected to a rear impact, the predetermined movement comprising an initial rearward movement of at least the front face of the bottom part of the back-rest element of the seat relative to the squab and relative to an upper part of the said back-rest element, and a subsequent rearward movement of the back-rest element in which the lower part of the back-rest rest element does not move rearwardly relative to the top part of the back-rest element. Frangible means may be provided to resist the initial rearward movement.

Preferably blocking means are provided to block said initial movement, with further means being provided to withdraw the blocking means in response to a signal from a sensor.

The subsequent rearward movement may be a pivoting movement of the back-rest element, this pivoting movement being about a pivot axis defined by a recliner mechanism which connects the back-rest element to the squab.

Preferably a load absorber is provided to resist the subsequent movement. The load absorber may be a spring or a friction device.

The initial movement may comprise a movement of the entire back-rest element, and the back-rest element may move in such a way that the lower part of the back-rest element moves rearwardly and the entire seat back element moves upwardly, the back-rest element effecting a movement equivalent to a pivotal movement about a virtual pivot point.

The back-rest element may be supported by guide means which are connected to the squab of the seat, the guide means each defining two slots, protruding means being provided on the back-rest element extending into the slots. Alternatively the back-rest element may be supported by support brackets which are each connected to the squab by two links. The spacing between the points of connection of the two links to the support bracket may be different from the spacing between points of connection of the two links to the squab, the links thus being non-parallel.

In an alternative embodiment there is, located within the seat back element, a frame having two spaced apart side arms, there being an element extending between mounting means provided at or adjacent the lower ends of the side arms, the element being of arcuateform and being rotatable, there being a net or equivalent element mounted within the frame, and being secured to the arcuate element, the arcuate element initially having a position in which the net or the like is tensioned, the arcuate element being movable to a position in which the arcuate element is located rearwardly of its initial position and the net or equivalent element is not tensioned to permit the lower part of the front face of the seat-back element to effect initial movement.

Preferably frangible means are provided to retain the pivotal element in its initial position.

Alternatively block means are provided to block the movement of the pivotal element, with means being provided to withdraw the blocking means in response to a signal from a sensor.

The seat-back element may be connected to the squab by means of a carriage adapted to slide along a substantially horizontal rail to enable the seat-back element to execute a rearward sliding movement as, or as part of, the said subsequent rearward movement.

In order that the invention may be more readily understood, and so that further features thereof may be appreciated, the invention will now be described, by way of example, with reference to the accompanying drawings.

BRIEF DESCRIPTION OF THE DRAWINGS

FIG. 1 is a diagrammatic view of a seat for a motor vehicle at the commencement of a rear impact.

FIG. 2 is a view corresponding to FIG. 1 illustrating the seat of FIG. 1 shortly after the rear impact has commenced.

FIG. 4 is a partial view corresponding to FIG. 3 illustrating a modified embodiment of the invention.

FIG. 5 is a diagrammatic view of an alternative form of vehicle seat in accordance with the invention at the commencement of a rear impact.

FIG. 6 is a view corresponding to FIG. 5 illustrating the seat of FIG. 5 shortly after the rear impact has commenced.

FIG. 7. is a view corresponding to FIG. 6 illustrating the seat at a further subsequent stage during the rear impact.

FIG. 12 is a diagrammatic view of a vehicle seat at the commencement of a rear impact.

FIG. 13 is a side view of an element forming part of the back of the seat of FIG. 12.

FIG. 14. is a front view of the element illustrated in FIG. 13.

FIG. 15 is a view corresponding to FIG. 12, illustrating the seat of FIG. 11 shortly after the rear impact has commenced.

FIG. 16 is a view of the element of FIG. 13 illustrating the element in the condition corresponding to the state of the seat shown in FIG. 15.

FIG. 17 is a front view of the element of FIG. 13.

FIG. 18 is a view corresponding to FIG. 15 showing a further subsequent stage in a rear impact.

Like reference numerals are used for like parts throughout the drawings.

DETAILED DESCRIPTION OF THE PREFERRED EMBODIMENT

Figure 3:
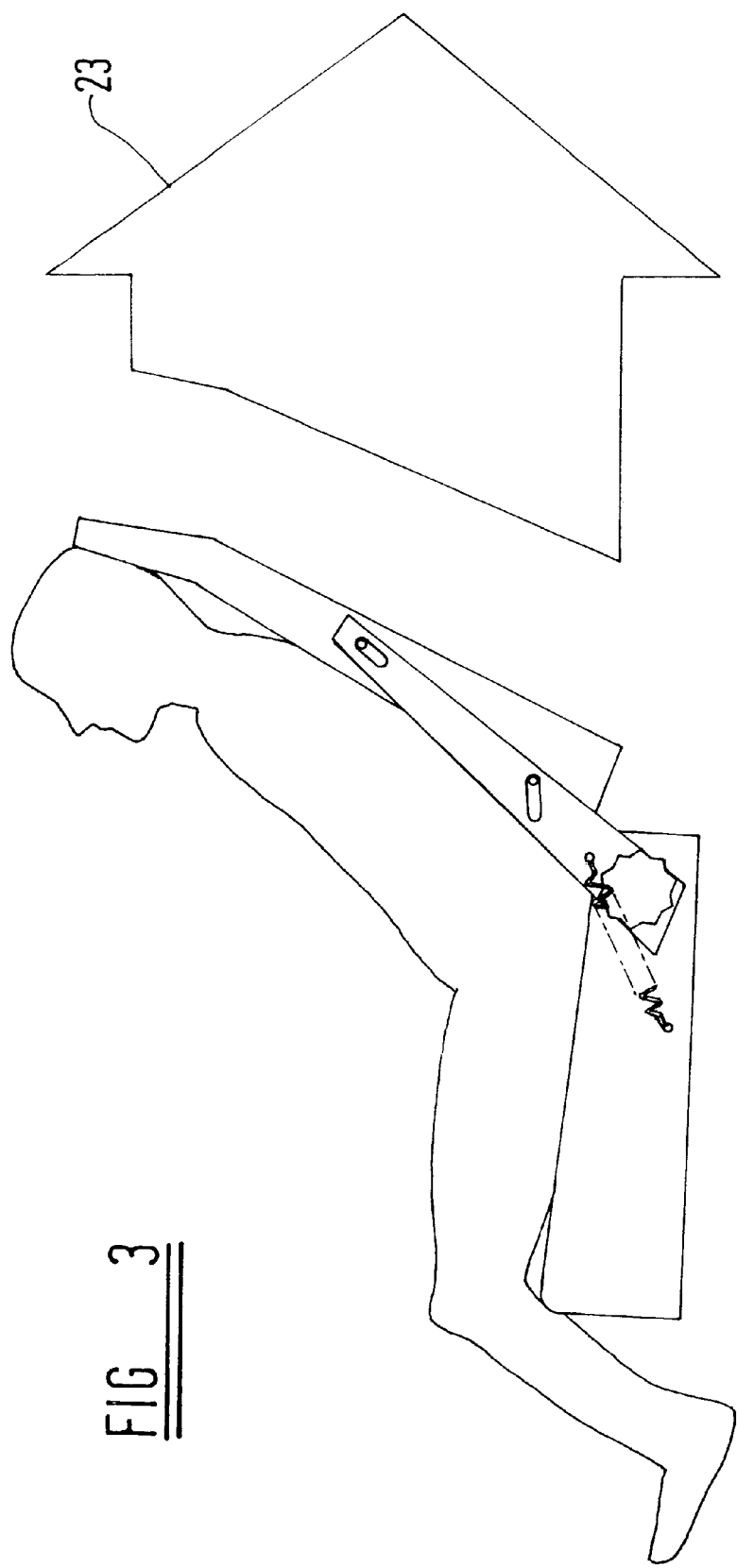
FIG. 3 is a figure corresponding to FIGS. 1 and 2 illustrating the seat at a further subsequent stage during a rear impact.

Referring initially to FIGS. 1 to 3, a vehicle seat for use in a vehicle such as a car or bus, comprises a squab or seat cushion 1 which is connected to the floor or chassis of the vehicle. The squab or seat cushion 1 may be connected to the floor of the vehicle by means of a sliding rail assembly. However when the vehicle is actually use, the squab of the seat is fixed relatively securely to the floor of the vehicle.

The seat is provided with a back-rest assembly 2.

The back-rest assembly 2 is connected to the squab by means of a recliner mechanism 3 which is in the form of a control mechanism for adjusting the angle of the back-rest The recliner mechanism 3 is connected to the squab 1 and supports a guide rail 4 which extends in an upright manner above the squab 1. Corresponding recliner mechanisms and guide rails are provided on each side of the squab of the seat. Each guide rail 4 defines two slots 5,6. Each slot receives a respective metal rod or pin 7,8, the pins being attached to the side of, and extending laterally outwardly from, a padded back-rest element 9. A frangible pin 10 is provided which extends from the back-rest element 9 and through an aperture formed in the guide rail 4.

The lower-most slot 5 is angled diagonally upwardly in relation to the seat, while the upper slot 6 is virtually parallel with the back-rest element 9 and with the axis of the guide rail 4.

It is to be observed that the upper slot 6 and the associated pin 8 is positioned fairly high up on the back-rest, that is to say, the slot and pin are positioned at a height which corresponds with at least 40% and preferably 50% of the entire height of the back-rest.

In the embodiment illustrated, a spring 11 is provided extending between a position on the squab 1 and a position on the guide rail 4. The spring 11 is provided as a load inhibitor, or energy absorber as will become clear from the following description. It is to be appreciated, however, that in alternative embodiments of the invention, instead of using a spring 11, a friction device, such as a brake within the recliner mechanism 3, or some other element adapted to absorb energy, could be utilised.

The seat is illustrated in FIG. 1 in an initial condition, with an occupant 12 sitting on the seat. A notional vertical line 13 is shown extending in alignment with the rear part of the head 14 of the occupant of the seat. It is to be observed that the back-rest element 9 is inclined rearwardly relative to the vertical line 13 with an angle of inclination. Typically, this angle of inclination will be in the range of 5 to 25°. The precise angle of inclination will vary, depending upon the adjustment effected to the back-rest by the occupant utilising the recliner mechanism 3.

It is to be observed that the lower part of the torso of the occupant 12 of the seat is pressed firmly against the lower part 15 of the back-rest element 9 of the seat, whereas the upper part 16 of the back-rest element of the seat, which effectively constitutes a head-rest 17, is spaced from the rear of the head 14 of the occupant of the seat When a vehicle in which the seat is mounted is subjected to a rear impact, as indicated by the arrow 18, the floor of the vehicle, and thus the squab 1 of the seat, will be given a forward acceleration. The lower part of the torso, and the legs, of the occupant of the vehicle tend to move rearwardly relative to the seat, due to the forward acceleration imparted to the seat, and the inertia of the occupant. Consequently, the base of the spine of the occupant 12 is immediately pressed against the lower part 15 of the back-rest element 9.

As the base of the occupant's spine is pressed against the lower part 15 of the back-rest element 9, when the force imparted to the lower part 15 of the back-rest element 9 exceeds a predetermined threshold, the frangible pin 10 breaks. This absorbs part of the energy applied to the back-rest element 9 of the seat, but also frees the back-rest element, permitting the back-rest element to move. The back-rest element 9 moves rearwardly and upwardly as the pins 7 and 8 slide along the slots 5 and 6. The back-rest element 9 thus effects a movement that is equivalent to a pivoting movement about a notional pivot point. The pin 7 in the slot 5 slides from an initial lower position to a subsequent upper position. This movement is angled diagonally upwards and rearwards in relation to the intended forward direction of travel of the vehicle. The upper pin 8 simultaneously moves upwardly in an almost vertical line. The rearward movement is indicated by the arrow 20, in FIG. 2, and the upward movement is indicated by the arrow 21.

As a consequence of the rearward movement of the lower part 15 of the back-rest element 9, the upper part 16, with the integral head-rest 17 actually moves forwardly as indicated by the arrow 22, thus coming into contact with the rear part of the head 14 of the occupant 12. This forward motion of the upper part of the back-rest element 9 is of importance, since the head 14 of the occupant is now engaged by, or cradled by, the head-rest 17.

It is to be observed that the angle of inclination of the back-rest element 9 relative to the notional vertical line 13 has changed. The back-rest element has moved so that the angle with the vertical line alters by at least 5°. However, it is to be understood that the change of angle may be greater than 5° and may be up to 45°.

The seat will have the condition illustrated in FIG. 2 in which the rearward and upward movement of the back-rest element 9 has been completed shortly after commencement of the rear impact.

If the rear impact is a substantial rear impact, imparting a very high acceleration to the seat, the head and torso of the occupant will press against the entire back-rest element 9, engaging not only the lower part 15, but also the upper part 16 and the head-rest 17. This will cause the entire back-rest to move rearwardly with a pivotal motion (as indicated by the arrow 23 in FIG. 3), pivoting about the axis defined by the recliner mechanism 3, provided that the force applied to the back-rest element 9 is sufficient to extend the spring 11. As the spring 11 is extended it absorbs energy, and the torso and head of the occupant are relatively gently accelerated A similar relatively gentle acceleration may be accomplished using a friction element incorporated into the recliner mechanism 3. Thus, during this stage, the back-rest element moves rearwardly with a pivoting motion and the lower part of the back-rest element does not move rearwardly relative to the top part of the back-rest element. Thus, the head of the occupant is not accelerated forwardly relative to the torso of the occupant.

It is to be appreciated that as a result of the fact that the head and trunk are supported by the whole of the back-rest element 9, and as a consequence of the fact that the head and trunk of the occupant are accelerated relatively gently, the risk of injury is substantially reduced.

It is thus to be understood that in use of the described seat, in the event that a rear impact should arise, initially the lower part 15 of the back-rest element 9 moves rearwardly relative to the squab 1 and also relative to the upper part 16 of the back-rest element 9 of the seat. Subsequently, if a substantial force is applied to the back-rest element 9, the back-rest element 9 moves rearwardly with a pivotal action, with the top part of the back-rest element 9 moving rearwardly a greater distance than the bottom part.

FIG. 4 illustrates a modified embodiment of the invention which is similar to FIG. 3 save that the recliner mechanism 3 is mounted on a carriage 29 adapted to slide along a horizontal rail 30 provided on the squab 1 of the seat. The carriage 29 is adapted to move from a forward position (not shown) to a rearward position (as illustrated) during a rear impact following the initial movement of the back-rest element 9 relative to the guide rail 4. Thus, the movement of the carriage 29 is effected only when sufficient force has been applied to the seat back-rest element 9 to overcome the retaining force provided by the spring 11. It is to be appreciated that the movement provided by the carriage 29 may replace or complement the pivoting movement about the axis of the recliner mechanism 3 as described with reference to FIGS. 2. and 3.

It is to be understood that in each of these movements, that is to say, the sliding movement of the carriage 29 or the movement about the axis defined by the recliner mechanism 3, the lower part 15 of the back-rest elements 9 does not move rearwardly relative to the upper part of the back-rest element 9. Instead, the back-rest element 9 moves rearwardly, either with a constant angle of inclination, or with an increasing angle of inclination. This prevents any forward acceleration, relative to the torso, being applied to the head of the occupant of the vehicle.

It is to be understood that it is important, in this embodiment, for the upper part of the seat-back element 9 to move forwardly during the initial stage of the rear impact, so that the head of the occupant of the vehicle is supported by the upper part of the seat back or the head-rest as rapidly as possible. Subsequently, it is important that the head and the torso are accelerated in a directly equivalent manner so that there is no uncontrolled relative acceleration between the head and the torso of the occupant. This can substantially reduce the risk of any injuries such as so-called "whiplash" injuries arising.

FIGS. 5 to 7 illustrate a second embodiment of the invention. In this embodiment of the invention, two pivot links 31,32 are provided, the lower end of each pivot link being connected to the squab 1 and the upper end of each pivot link being connected to a "L" shaped support bracket 33. The pivot points connecting the pivot links to the squab 1 are spaced further apart than the pivot points connecting the links to the support bracket 33. The two links a thus not entirely parallel The L-shaped support bracket 33 defines an aperture 34 which receives a frangible pin, the frangible pin being mounted on the squab 1. The L-shaped support bracket 33 supports the recliner mechanism 3, the recliner mechanism 3 being connected directly to a frame present within the back-rest element 9. The back-rest element 9 is inclined rearwardly relative to the vertical line 13 by 5 to 25°. The degree of inclination can vary depending on the occupant's adjustment of the back-rest element 9 with the recliner mechanism 3.

Support brackets as described, will be provided on both sides of the squab.

In an initial condition, the position of the occupant relative to the main component of the seat corresponds with the condition illustrated in FIG. 1. When a seat as illustrated in FIG. 5 is involved in a rear impact, the frangible pin received within the aperture 34 will break as a consequence of the force applied to the lower part 15 of the back-rest element 9 by the torso of the occupant 12 of the vehicle, and the L-shaped support bracket 33 will then move to a rearward position, with a consequent movement of the linkage constituted by the links 31 and 32. The movement of the L-shaped bracket 33 is such that the back-rest element 9 executes a motion that is equivalent to a pivoting movement about a virtual pivot point so that the seat back moves from an inclined position relative to the notional vertical line 13 as shown in FIG. 5 to a more vertical position as shown in FIG. 6. During this motion about the virtual pivot point, the upper part 16 and the head-rest 17 moves forwardly while the lower part 15 of the back-rest element 9 moves rearwardly. The head-rest 17 is thus brought into contact with the rear part of the head 14 of the occupant.

Subsequently, as shown in FIG. 7, the back-rest element 9 moves rearwardly with a pivoting motion about the axis defined by the recliner mechanism 3.

It is to be appreciated that a spring 11 or an alternative energy-absorbing device or friction brake may be provided, for example in the recliner mechanism 3 so that the back-rest element 9 only effects the rearward pivoting movement about the axis defined by the recliner mechanism 3 when the torso and head of the occupant apply a very substantial force to the back-rest element 9.

It will be understood that the seat illustrated in FIGS. 5 to 7 provides a similar degree of protection to the occupant of the vehicle as the seat described with reference to FIGS. 1 to 3.

Figure 8:
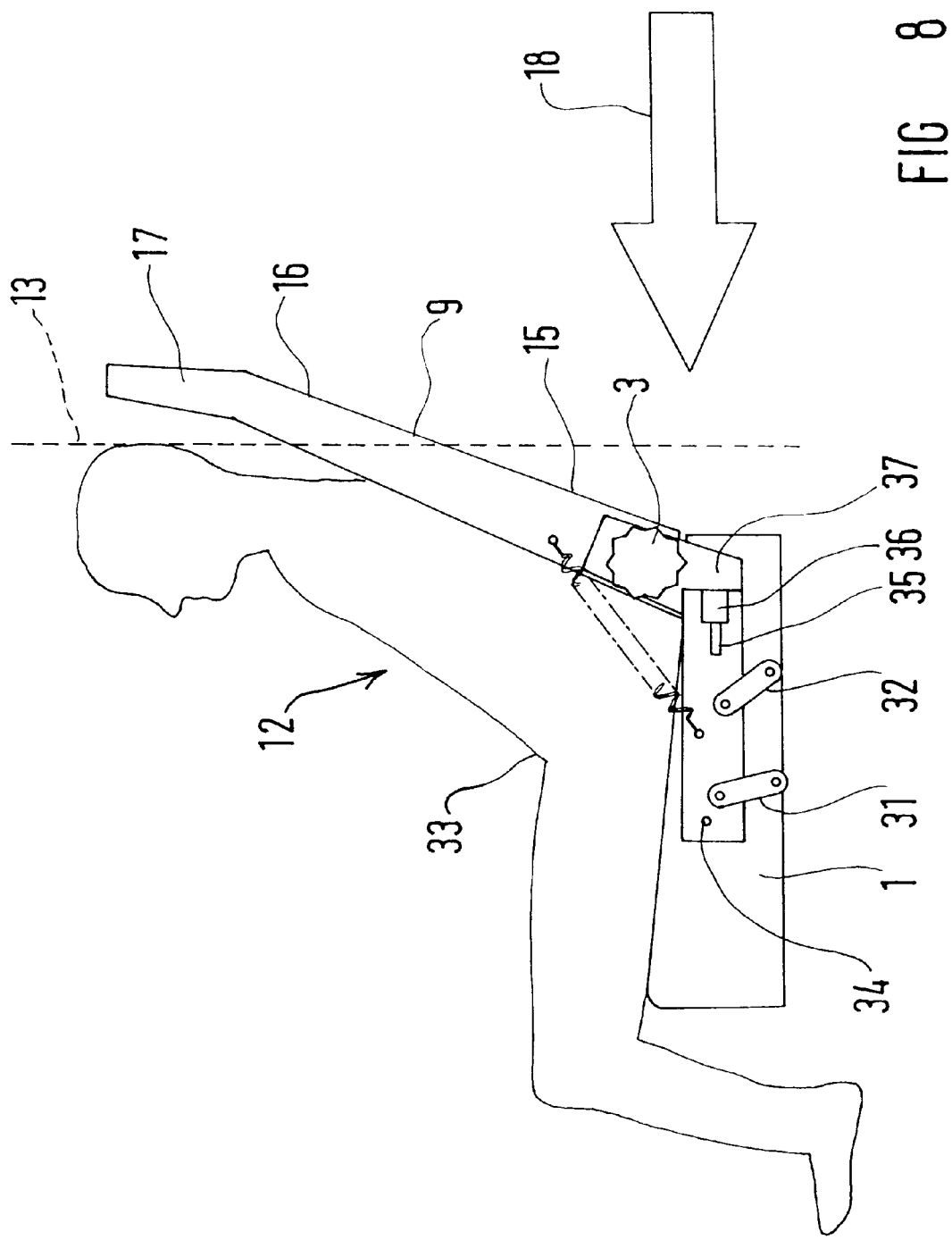
FIG. 8 is a view corresponding to FIG. 5 illustrating a modified embodiment of the invention.

FIG. 8 illustrates a seat similar to that of FIG. 5 except the support bracket 33 comprises a simple plate which carries a horizontal rail 35 in which is mounted a carriage 36 which supports a bracket arm 37. The bracket arm 37 carries the recliner mechanism 3. This enables the seat back to move rearwardly, when sufficient force has been applied to overcome the retaining force provided by the spring 11, with the seat back element maintaining a constant angle of inclination, or with the seat back element also tilting.

Figure 9:
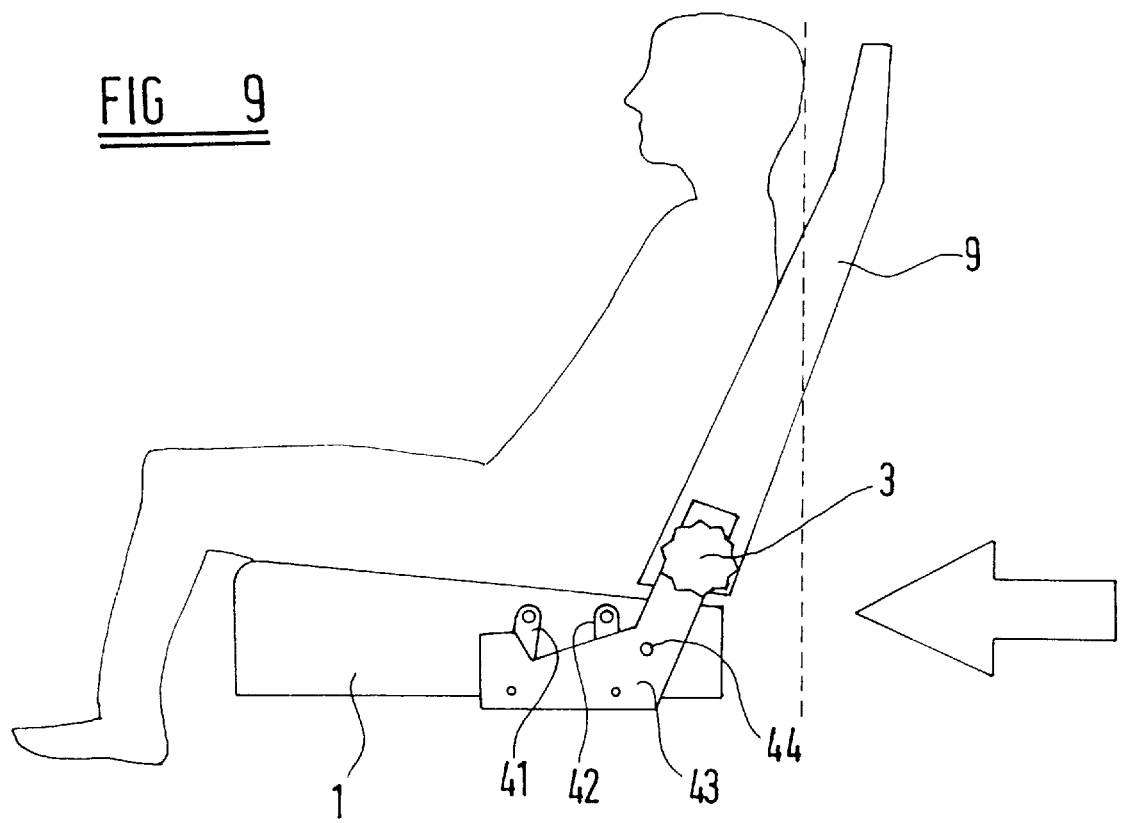
FIG. 9 is a diagrammatic view of a further embodiment of a vehicle seat at the commencement of a rear impact.
Figure 10:
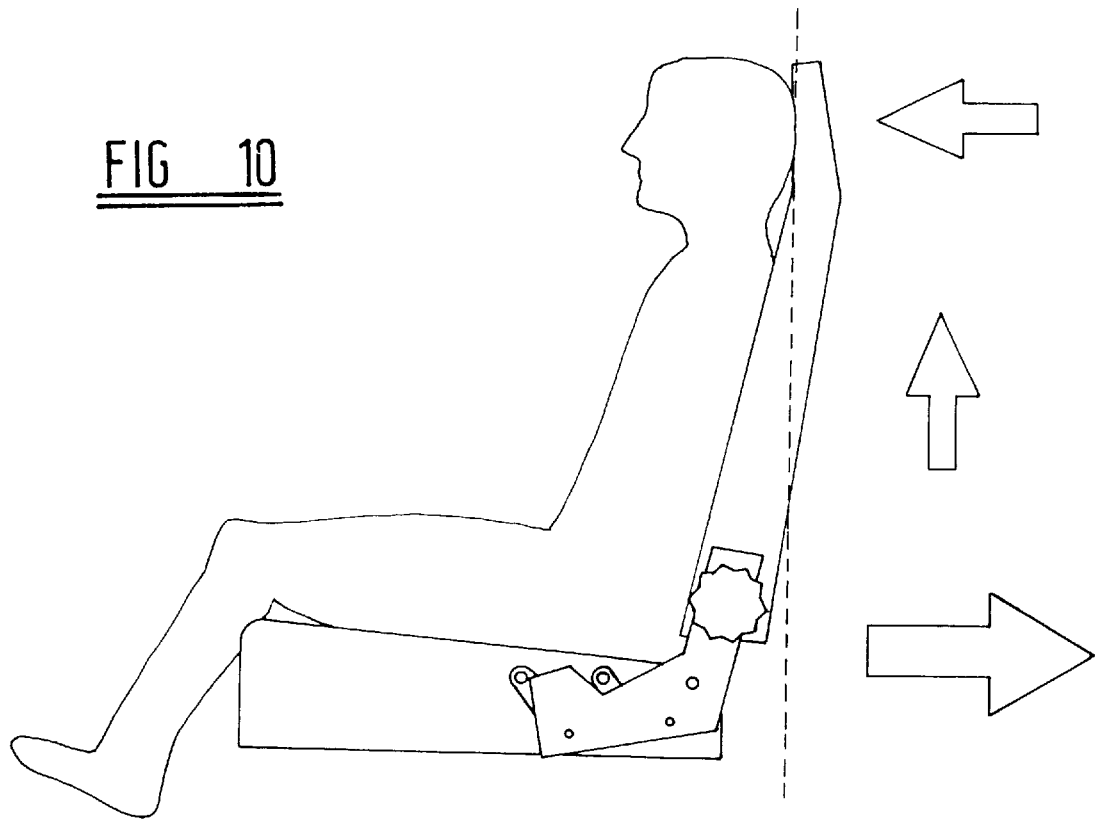
FIG. 10 is a view corresponding to FIG. 9 shortly after the rear impact has commenced.
Figure 11:
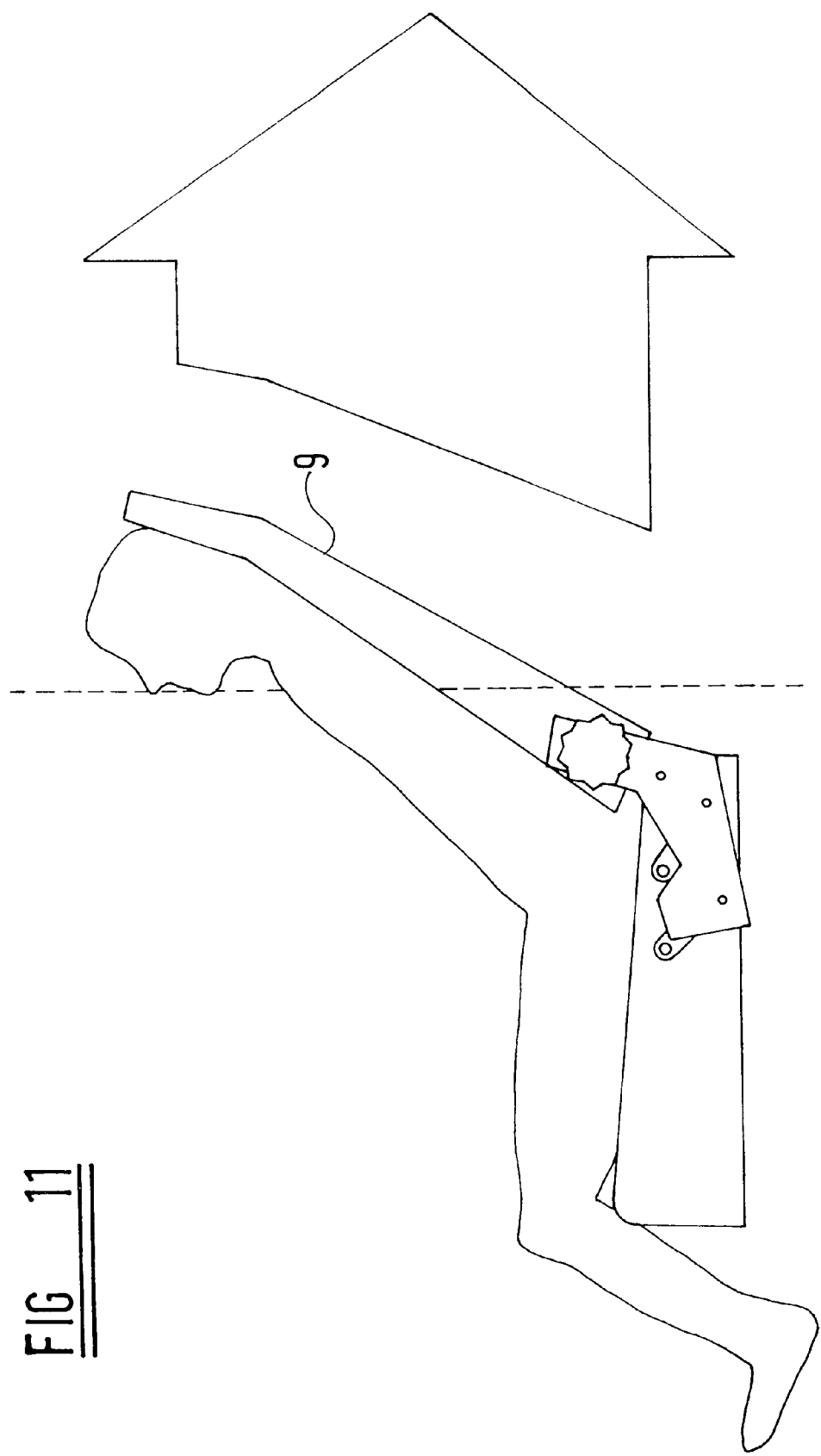
FIG. 11 is a view of the seat of FIG. 10 showing the seat at a further subsequent stage during the rear impact.

FIGS. 9 to 11 illustrate an alternative embodiment of the invention, which is similar to the embodiment of FIGS. 5 to 7. In the embodiment of FIGS. 9 to 11 two links 41,42 are provided, the upper ends of the links 41,42 being connected to the seat squab 1, the lower ends of the links being connected to an L-shaped support bracket 43. It is to be observed that the upper ends of the links 41,42 are closer together than the lower ends of the links. The links operate in a very similar manner to the links of the embodiment of FIGS. 5 to 7. The L-shaped support bracket 43 defines an aperture 44 which receives a frangible pin mounted on the seat squab 1. Support brackets as described are provided on both sides of the squab of the seat.

A back-rest element 9 is connected to the support bracket 43 by a recliner mechanism 3, in the manner described above with reference to the embodiment of FIGS. 5 to 7.

The embodiment of FIGS. 9 to 11 is effectively very similar to the embodiment of FIGS. 5 to 7, the only substantive difference being the orientation of the links 41,42. In the embodiment of FIGS. 5 to 7, the links have their lower ends connected to the seat squab and their upper ends connected to the support bracket, whereas in the embodiment of FIGS. 9 to 11, the links have their upper ends connected to the seat squab and their lower ends connected to the support bracket. The effect, however, is the same and in a rear impact, once the frangible pin received in the aperture 44 has been broken, the back-rest element 9 will effect a movement that is equivalent to a pivoting movement about a virtual pivot point. Subsequently, as shown in FIG. 11, the back-rest element 9 will effect a rearward pivot motion about the axis of the recliner 3, in the manner described in more detail above.

In a modified embodiment the links 41,42 may be mounted on a carriage equivalent to the carriage 36 of FIG. 8.

FIG. 12 illustrates a further embodiment of the invention. In this embodiment of the invention, a back-rest element 9 is connected to the squab 1 of the seat by means of recliner mechanism 3. Contained within the seat back element 9 is an internal frame 50, illustrated in FIGS. 13 and 14. The frame 50 has an upper cross-piece 51 and two depending side arms 52,53. The frame is of inverted "U" configuration. The lower end of each side arm 52,53 is provided with a support element 54,55, such as a bearing or bushing. Rotatably mounted between the support elements 54 and 55 is an arcuate element 56. The arcuate element 56 is thus located in the lower part 15 of the back-rest element 9.

Mounted on the frame is a net 57 which may be made of metal wire or the like, the net having its upper edge connected to the top cross-piece 51 and its side edges connected to the depending side arms 52,53 by means of a plurality of resilient springs 58. The lower edge of the net is connected to the arcuate element 56. The arcuate element is illustrated, in FIGS. 13 and 14, in a position in which it has been swung downwardly and forwardly. The net is thus tensioned. The arcuate element 56 may have been swung sufficiently forwardly to have passed "over-dead-centre" and thus to be naturally retained in position. However, a frangible element or pin 59 may be located adjacent the arcuate element 56 to retain the arcuate element in position.

If a vehicle in which the seat is mounted is subjected to a rear impact, the lower part of the torso of the occupant 12 of the vehicle will, in the manner described above, with reference to the embodiments of FIGS. 1 to 7, be pressed firmly against the lower part 15 of the back-rest element, 9 of the seat. This will cause the arcuate element 56 to rotate in a rearward direction as generally indicated by the arrow 60, if the force applied is sufficient to move the arcuate element through the "dead-centre" position. If a frangible element 59 is provided, the force applied to the lower part 15 of the back-rest element 9 by the torso of the occupant 12 must be sufficient to break the frangible element 59 between the arcuate element 56 can rotate. However, if the arcuate element 56 is moved rearwardly through the "dead-centre" position, (and the frangible element breaks, if one is provided), then the arcuate element 56 will continue to rotate, thus substantially releasing the tension initially present within the net 57. The arcuate element 56 will then extend to the rear of the side arms 52,53 of the frame 50.

The seat will then enter the condition illustrated in FIGS. 15 to 18. As can be seen from FIGS. 16 and 17, the arcuate element 56 has rotated through an arc. The arc of rotation is preferably at least 15°, and may be in the region of 25 to 50°. Tension in the net 57 has been substantially released and, as can be seen from FIG. 15, the net 57 now sags rearwardly, rather than stretching tautly between the side arms 52,53 of the frame. As can be seen from FIG. 15, the front face of the back-rest element 9 in the lower part of the back-rest element has moved rearwardly, thus enabling the torso of the occupant of the seat to move rearwardly to such a position that the head of the occupant is in contact with the head-rest 17 provided at the top of the back-rest element 9.

As illustrated in FIG. 18, the entire back-rest element 9 may subsequently pivot rearwardly, as illustrated by the arrow 23, about an axis defined by the recliner mechanism 3. This movement is equivalent to the movement described with reference to the preceding embodiments in all material respects. Thus the movement may be effected it the load applied is sufficient to overcome the resisting effect provided by a load absorber such as a spring equivalent to the spring 11, or a friction device, such as a brake in the recliner mechanism, or some other device that absorbs energy.

The recliner mechanism may be connected to the squab by means of a carriage movable along a rail mounted on the squab to enable the seat-back to effect a rearward sliding motion, as described with reference to FIG. 4.

Following an accident, a seat in accordance with the invention, as described above, may be virtually undamaged, and the seat may be re-used. Of course, any frangible elements that have broken will need to be replaced, and other items such as springs or load inhibitors may need to be checked or refurbished.

I claim:

1. A seat for use in a vehicle, the seat comprising a squab which is secured to the floor of the vehicle; a back-rest element having an upper part and a bottom part, and means for mounting the back-rest element on the squab for movement relative to the squab with said mounting means including further means for effecting predetermined movements of the back-rest element when the seat is occupied and the vehicle in which the seat is mounted is subjected to a rear impact, with said predetermined movements comprising an initial rearward movement of at least the front face of the bottom part of the back-rest element of the seat relative to the squab and relative to the upper part of the said back-rest element, and a subsequent rearward movement of the back-rest element in which the lower part of the back-rest element does not move rearwardly relative to the top part of the back-rest element.

2. A seat according to claim 1 wherein frangible means for resisting the initial rearward movement are connected between an element of said further means which moves when said back-rest element executes the initial rearward movement, and a relatively fixed point.

3. A seat according to claim 1 wherein said further means include blocking means to block said initial movement, and means to withdraw the blocking means in response to a signal from a sensor.

4. A seat according to claim 1 wherein said further means causes the subsequent rearward movement to be a pivoting movement of the back-rest element.

5. A seat according to claim 4 wherein said mounting means connects the back-rest element to the squab by a recliner mechanism that can be used to adjust the inclination of the back-rest element relative to the squab, and said subsequent rearward movement is a pivoting movement about a pivot axis defined by the recliner mechanism.

6. A seat according to claim 1 wherein said further means includes a load absorber for resisting said subsequent rearward movement connected between an element of said further means which moves during said subsequent rearward movement and a relatively fixed point.

7. A seat according to claim 6 wherein said load absorber is a spring.

8. A seat according to claim 6 wherein said load absorber is a friction device.

9. A seat according to claim 1 wherein said further means causes the initial movement to comprise a movement of the entire back-rest element such that the lower part of the back-rest element moves rearwardly.

10. A seat according to claim 9 wherein said further means causes the initial movement of the back-rest element to be such that as the lower part of the element moves rearwardly, the entire back-rest element moves upwardly, with the back-rest element effecting a movement equivalent to a pivotal movement about a virtual pivot point.

11. A seat according to claim 1 wherein the back-rest element is supported by guide means which are part of the further means and which are connected to the squab of the seat and extend on respective opposite lateral sides of the back-rest element, the guide means each define two slots, a lower slot extending rearwardly and inclined upwardly and an upper slot extending substantially parallel to the axis of the guide rail, and protruding means are provided on the lateral sides of the seat-back element and extend into the respective slots.

12. A seat according to claim 1 wherein the seat-back element is supported by L-shaped support brackets, with each support bracket being connected on a respective opposite lateral side of the back-rest element and being connected to the squab of the seat by two links.

13. A seat according to claim 12 wherein the spacing between the points of connection of the two links to each support bracket is different from the spacing between the points of connection of the two links to the squab, the links thus being non-parallel.

14. A seat according to claim 1 wherein located within the seat-back element is a frame having two spaced apart side arms, there being an element extending between mounting means provided at or adjacent the lower ends of the side arms, the element being of arcuate form and being rotatable, there being a net or equivalent element mounted within the frame and being secured to the arcuate element, the arcuate element initially having a position in which the net or the like is tensioned, the arcuate element being movable to a position in which the arcuate element is located rearwardly of its initial position and the net or equivalent element is not tensioned to permit the lower part of the front face of the seat-back element to effect said initial movement.

15. A seat according to claim 14 wherein frangible means are provided to retain the pivotal element in its initial position.

16. A seat according to claim 15 wherein blocking means are provided to block the movement of the pivotal element, means being provided to withdraw the blocking means in response to a signal from a sensor.

17. A seat according to claim 1 wherein the seat-back element is connected to the squab by means of a carriage adapted to slide along a substantially horizontal rail to enable the seat-back element to execute a rearward sliding movement as, or as part of, the said subsequent rearward movement.

* * * * *